United States Patent [19]

Martin

[11] Patent Number: 5,545,007
[45] Date of Patent: Aug. 13, 1996

[54] ENGINE BLADE CLEARANCE CONTROL SYSTEM WITH PIEZOELECTRIC ACTUATOR

[75] Inventor: Anthony N. Martin, Simsbury, Conn.

[73] Assignee: United Technologies Corp., Hartford, Conn.

[21] Appl. No.: 345,653

[22] Filed: Nov. 25, 1994

[51] Int. Cl.⁶ ........................................... F01D 11/22
[52] U.S. Cl. ........................ 415/173.2; 415/14; 415/118
[58] Field of Search ............................ 415/173.2, 173.3, 415/14, 118

[56] References Cited

U.S. PATENT DOCUMENTS

| | | | |
|---|---|---|---|
| 4,087,199 | 5/1978 | Hemsworth et al. | 415/173.1 |
| 4,384,819 | 5/1983 | Baker | 415/14 |
| 4,462,264 | 7/1984 | Feller | 73/861.18 |
| 5,012,420 | 4/1991 | Walker | 415/118 |
| 5,370,340 | 12/1994 | Pla | 381/71 |

FOREIGN PATENT DOCUMENTS 11989267301  10/1989  Japan ................................. 415/173.1

*Primary Examiner*—Edward K. Look
*Assistant Examiner*—Michael S. Lee
*Attorney, Agent, or Firm*—William W. Jones

[57] ABSTRACT

The blades and the outer case of an encased engine, such as a turbo engine or the like will expand and contract during periods of operation. Blade expansion and contraction can result from operating temperature changes, rotational velocity changes, or the like. The engine casing includes a segmented seal which is properly spaced apart from the engine blade tips so as to provide optimum operation of the engine. Proximity sensors mounted on the engine detect the radial clearance of the engine blades to the seal segments at all times. The seal segments are mounted on a corrugated piezoelectric support which is electrically stimulated so as to properly adjust the seal segments relative to the blade tips to provide the proper spacing as the blades and case expand and contract. Appropriate stimulation of the piezoelectric support will move the seal segments toward or away from the blade tips as needed.

6 Claims, 3 Drawing Sheets

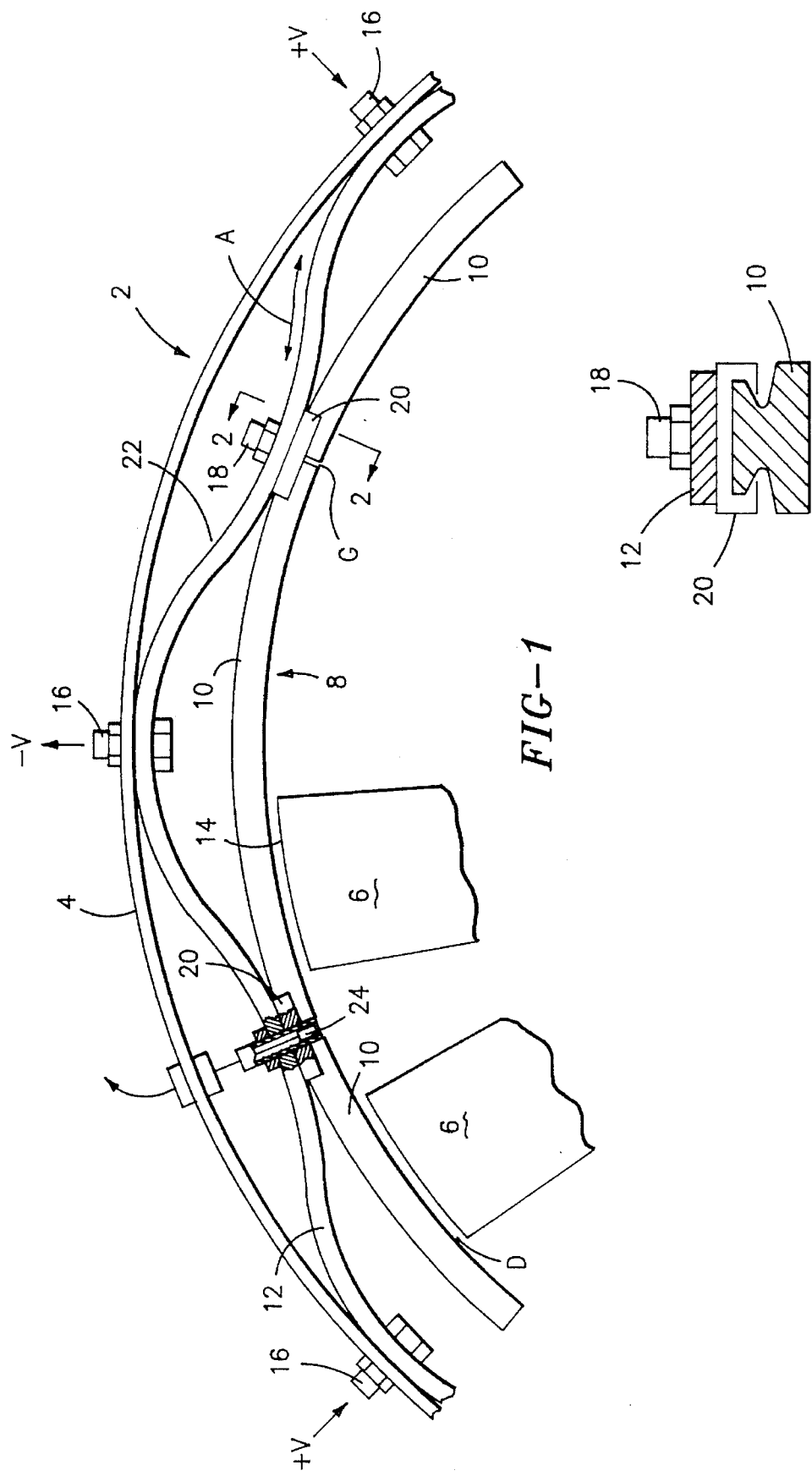

ENGINE BLADE CLEARANCE CONTROL SYSTEM WITH PIEZOELECTRIC ACTUATOR

TECHNICAL FIELD

This invention relates to an active turbo engine clearance control system which includes a piezoelectric actuator for maintaining the optimum spacing between the engine blade tips and the seal shroud elements during operation of the engine.

BACKGROUND ART

Turbine engines, such as turbo prop or turbojet engines, include high speed blade rotor assemblies which operate inside of the engine casing. The blades on the rotor assemblies provide the propulsion force for the engine, and in order to operate properly and at peak efficiency, the blade tips must be properly spaced apart from tip sealing components coupled to the engine casing. The sealing components comprise a plurality of seal segments which are mounted on the casing radially of the blade tips. During engine operation the blades will expand and contract due to varying operating temperatures, rotational velocities, and the like. This, in concert with thermal and structural distortions of the engine case, results in variations in the spacing between the blade tips and the static seal segments, and can even result in contact between the blades and the seal segments. In theory, the space between the blade tips and the seal segments should be kept as small as possible, but the blade tips should never touch the seal segments as this would cause permanent wear damage to the seal material.

Efforts have been made to actively control the spacing between rotating engine blade tips and static seal segments so as to try to maintain the target minimal spacing while avoiding blade-seal contact. These active controls are designed to impart radial movement to the seal segments so as to attempt to maintain the target gap by moving the seal segments outwardly when the tip clearance decreases, and inwardly when the clearance increases. One such active control which utilizes heat to move the seals is disclosed in U.S. Pat. No. 4,928,240 granted May 22, 1990 to S. H. Davison, et al. U.S. Pat. No. 4,247,247 granted Jan. 27, 1981 to G. W. Thebert discloses a flexible seal shroud in a turbine engine which can be deflected toward turbine blade tips by means of pressurized gas introduced into a chamber adjacent to the seal shroud.

Solutions to the problem which involve selectively moving the blades or blade tips toward and away from the seal are also disclosed in the prior art. Examples of such solutions are found in U.S. Pat. No. 5,203,673 granted Apr. 20, 1993 to D. H. Evans; and in U.S. Pat. No. 5,263,816 granted Nov. 23, 1993. These patents disclose mechanical and magnetic active controls respectively.

Japanese Kokai Patent Application No. HEI (1989)-267, 301, published Oct. 25, 1989 discloses an active control system for a turbine engine which may utilize heat to selectively position seal shroud segments relative to the turbine blade tips; or in a second embodiment, may use piezoelectric actuators to position the shroud segments relative to the blade tips. The piezoelectric control system includes a gap sensor which senses the actual gap between the sensor and the rotating blade tips, and stacks of piezoelectric elements connecting each shroud segment with the fixed engine casing. Selectively variable voltage is applied to the piezoelectric element stacks by a servoamplifier in order to increase or decrease the thickness of each piezoelectric element in the stack thereby controlling the thickness of the stack so as to move each shroud segment relative to the blade tips. The use of a stack of radially aligned piezoelectric film layers to actively control the gap between the blades and the seal shroud of a turbine engine such as is disclosed in the aforesaid Japanese Kokai is impractical due to the limited amount of movement that can be obtained thereby. Each film layer, at maximum voltage, could only increase its thickness by approximately one micron ($10^{-6}$ meter). Thus if each stack consisted of as many as fifty film layers, the total possible range of motion would still be less than 0.005 inch. This limited range of motion is not acceptable in large gas turbine engines such as are found on commercial and military aircraft. Such engines require that a minimum of 0.050 inch range of active control motion be provided by the control system. The piezoelectric actuator disclosed in the Japanese Kokai is an impractical solution to the problem, however, some form of piezoelectric gap control actuator would be desirable since the ability to control distortion of a piezoelectric body with varying voltage provides very accurate and reliable control parameters.

DISCLOSURE OF THE INVENTION

This invention relates to a turbomachine blade-seal gap active control which utilizes a piezoelectric system to provide the active gap adjustments. The piezoelectric system of this invention can provide a range of gap adjustment that is suitable for use in large gas turbine engines on commercial and military aircraft, as well as in smaller turbo engines. The system of this invention utilizes a single or a plurality of fixed proximity sensors which are mounted on the engine casing or engine seal components and are able to sense the actual position of the turbine blades relative to the sensors. The seal shroud is made up of a plurality of curved segments which are connected to the static engine casing by means of the piezoelectric component. The piezoelectric mount is formed from a composite of piezoelectric and structural materials of which an example would be the class of barium titanate ceramics. The piezoelectric material would be formed so as to provide crystalline growth in response to applied voltage in a direction along the length of the curved segment, essentially in a tangential direction around the engine case. This is in direct contrast to the radial direction illustrated within the Japanese Kokai patent application. Manufacturing techniques for the piezoelectric mount include bulk moulding or sintered material film deposit. The mount has a serpentine or corrugated configuration when viewed from the direction of the engine axis, and it extends around the inside of the engine casing between the casing and the seal shroud segments. The piezoelectric mount has alternating corrugations fixed to the static engine casing, with intervening corrugations being clipped onto opposed ends of adjacent ones of the sealing shroud segments. The fixed connections with the casing provide means for applying the necessary voltage to the piezoelectric mount so as to cause it to flex to the extent necessary to reposition the seal shroud segments relative to the turbine blade tips. When an increased voltage is applied to the piezoelectric mount, it will try to expand in the in-plane direction. Such expansion is not possible, however, since it is pinned to the static engine casing. The result will be an increase in the bow of the individual corrugations which will cause the shroud segments to move toward the turbine blade tips. Lowering of the applied voltage will result in an outward movement of the seal segments due to a shortening of the piezoelectric mount. The mount can be formed as a unitary element that extends around the periphery of the engine casing, or it can be formed from several adjacent components, which are individually fixed to the casing and connected to the shroud segments.

It is therefore an object of this invention to provide an active clearance control system for use in turbo-machinery which system uses a piezoelectric actuator for controlling the clearance between turbine and/or compressor blade tips and a sealing shroud.

It is a further object of this invention to provide a clearance control system of the character described which is suitable for use in large gas turbine aircraft engines.

It is another object of this invention to provide a clearance control system of the character described which supplies fast response times to sensed clearance changes.

These and other objects and advantages of this invention will become more readily apparent from the following detailed description of an embodiment of the invention when taken in conjunction with the accompanying drawings, in which:

BRIEF DESCRIPTION OF THE DRAWINGS

FIG. 1 is a fragmented elevational view of a portion of a turbine engine showing an embodiment of the clearance control mechanism of this invention;

FIG. 2 is a cross-sectional view of a portion of the mechanism of FIG. 1 showing the manner of connection between the piezoelectric actuator and the seal shroud segments;

BEST MODE FOR CARRYING OUT THE INVENTION

Figure 3:
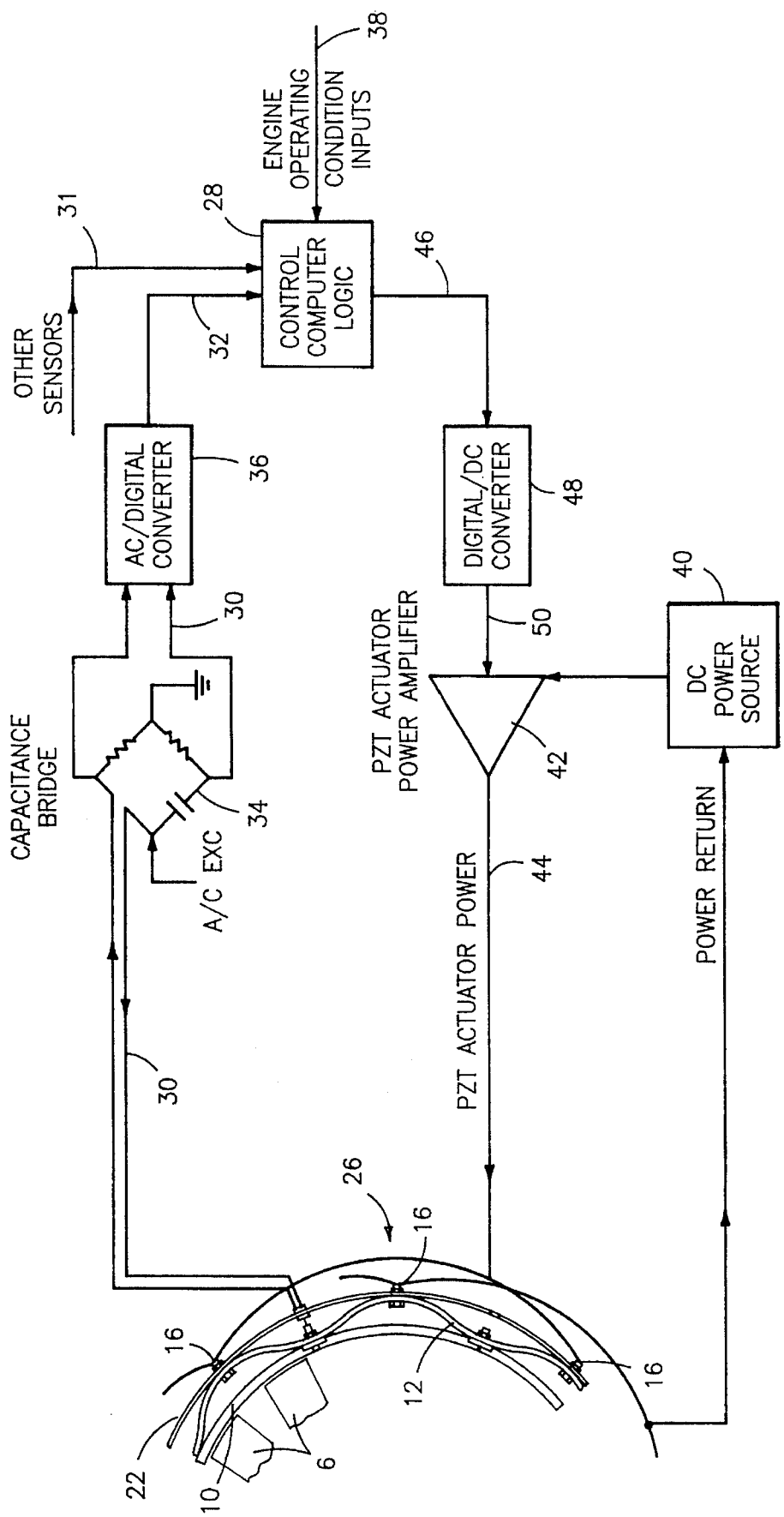
FIG. 3 is a schematic view of the control hardware components used in connection with the mechanism of FIG. 1.

Referring now to the drawings, there is shown in FIG. 1 a segment of a gas turbine engine of the type used in large commercial aircraft and in military aircraft. The engine is denoted generally by the numeral 2 and includes a casing 4 which is fixed to the aircraft and within which the rotating blades 6 of the turbine and compressor are found. The seal shroud 8 is made up of a plurality of segments 10 which are spaced apart from the outer tips 14 of the blades 6 a predetermined distance D. The distance D may be different under different flight conditions, but under any extant flight condition, there is a target optimum clearance distance D which should be maintained for proper and efficient engine operation. The seal shroud segments 10 are connected to the engine casing 4 by means of a connector 12 which takes the form of an undulating or corrugated strip that may be about one inch wide, and extends about the periphery of the engine casing 4, either as a unitary strip, or in appropriately sized segments. The connector 12 may be either a unitary or a segmented component. The connector 12 is formed from a piezoelectric composite material, as described, above, which will tend to expand in the longitudinal direction when subjected to an imposed voltage. The greater the imposed voltage, the greater the tendency for longitudinal expansion of the connector 12. The connector 12 is secured to the engine casing 4 by spaced-apart bolts 16 which also serve as electrical contacts for use in imposing the desired voltage on the connector 12. The bolts 16 form alternating positive and negative contacts for the operating voltage. The connector 12 is connected to the seal segments 10 by means of bolts 18 attached to channel clips 20 which loosely receive the proximal ends of adjacent seal segments 10. There will preferably be a gap G between adjacent seal segments 10 to prevent binding as the segments 10 are moved inwardly and outwardly relative to the casing 4. The system will include a plurality of proximity or clearance sensors 22 which are mounted on the casing 4 and which project through an opening 24 in respective ones of the seal segments 10. The sensors 22 are preferably capacitance type devices which can monitor the operating distance between the end surfaces 25 of the sensors 22 and the blade tips 14. Changes in the monitored distance are indicative of changes in the distance D between the blade tips 14 and the seal segments 10.

In general, the system can operate as follows. For any particular set of operating conditions for the turbine or compressor, a target distance D will be established. In the case of a gas turbine engine for an aircraft, at start-up, the distance D between the seal segments 10 and the turbine blade tips 14 will be relatively large, typically larger than the flight target distance. In all operating phases, an appropriate voltage may be imposed on the piezoelectric connector 12 so as to expand the connector 12 in the direction of the arrows A, i.e., in the longitudinal direction of the connector 12. Since the connector 12 is pinned to the casing 4 by bolts 16, it cannot by expansion alter the distance between adjacent bolts 16 when the voltage is applied. The result of imposing the voltage on the piezoelectric connector 12 is thus to increase the degree of bowing between adjacent bolts 16. This causes the seal segments 10 to be moved toward the blade tips 14 with a radial motion greatly magnified compared to the elongation of the connector segment 12. This magnification would be of the order of 100 to 1000 dependent on the relative distance between attachment points 16 and 18, and the radial distance between the engine case 2 and the seal pieces 10. When the sensors 22 confirm that the target clearance distance D has been achieved, the imposed voltage is maintained to preserve the target blade-seal segment clearance D. As the engine warms during operation, the blades 6 will expand so as to narrow the target operating clearance D. When the operational clearance D reaches a predetermined unacceptable value due to blade expansion, the voltage imposed on the piezoelectric connector 12 will be reduced so as to allow the connector 12 to contract sufficiently to move the seal segments 10 away from the blade tips 14 so as to reestablish a target operating clearance D which conforms to current operating conditions.

Referring now to FIG. 3, the active clearance control hardware components are shown in schematic fashion. A portion of the engine hardware is denoted generally by the numeral 26. A segment of the piezoelectric connector 12 is shown, as are the bolts 16 which affix the connector 12 to the engine casing. The blades 6 and seal segments 10 are shown in the engine section 26, as is the proximity sensor 22. The proximity sensor 22 transmits blade position signals to a microprocessor controller 28 via lines 30, 31 and 32. The position signals pass through a capacitive/resistive bridge where the sensor capacitance is compared against a reference capacitance to operate an AC voltage level applied to an AC/digital converter 36 and thence to the controller 28. The controller 28 also receives engine operating condition input signals via line 38. Engine operating conditions such as engine power settings, altitude, Mach #, inlet temperature, and the like, will be transmitted to the controller 28. A DC power source 40 is connected to a piezoelectric power amplifier 42 which powers the actuator connector 12 through line 44. The controller 28 is connected to the power amplifier 42 via line 46, digital-to-DC converter 48, and line 50.

Figure 4:
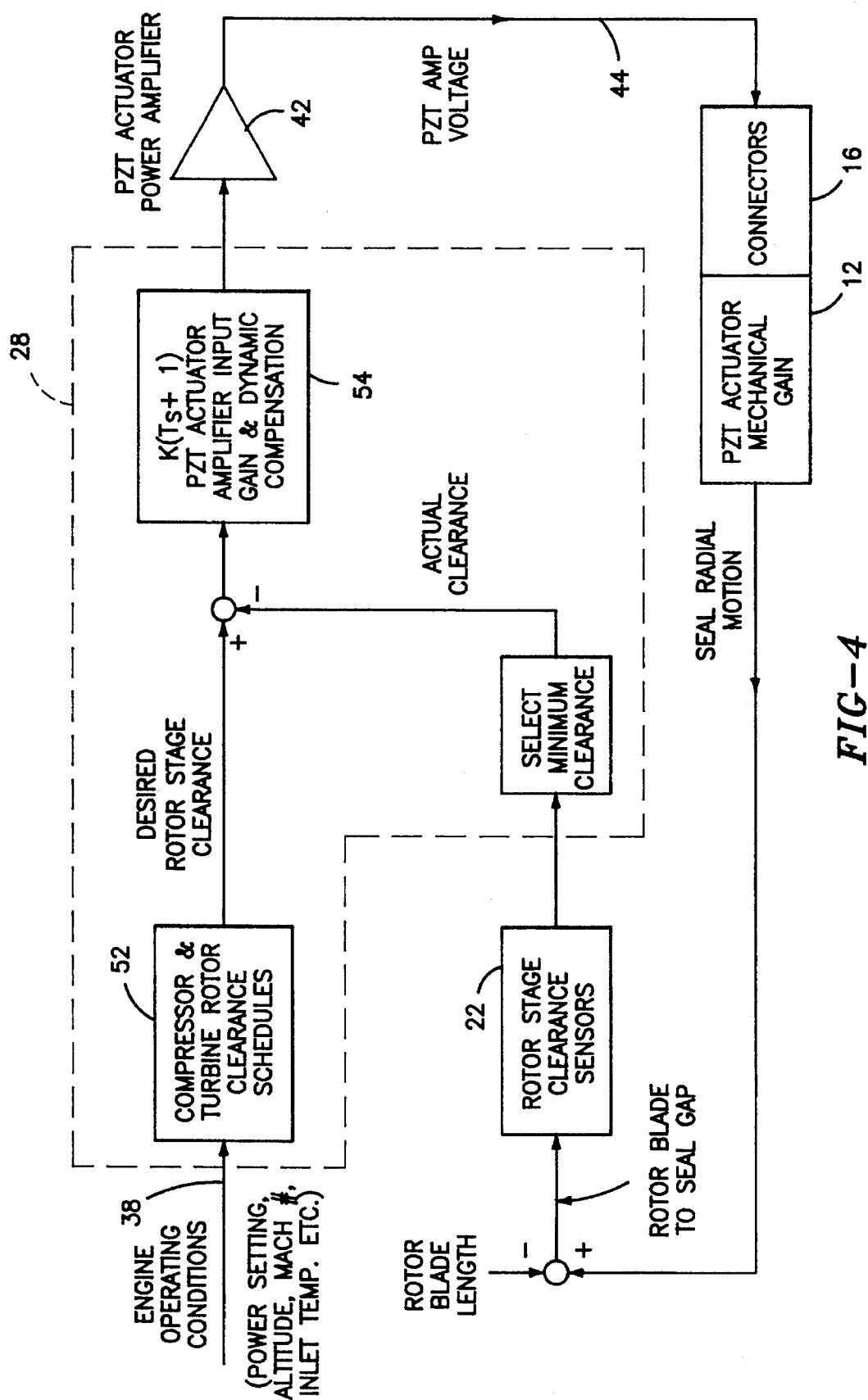
FIG. 4 is a schematic view of the control software used in connection with the hardware of FIG. 3.

The logic procedures which the controller 28 utilizes in establishing the desirable blade clearance values are shown in FIG. 4. The engine operating signals are fed into the controller 28 through line 38. The controller 28 is provided with a preprogrammed table or schedule 52 which identifies the desired compressor and turbine engine rotor clearance values for various sensed engine operating conditions. Information regarding the extant rotor blade length is received from the four rotor blade proximity sensors 22, and upon receipt thereof, the controller identifies the extant minimum clearance gap which is sensed by any of the sensors 22. That minimum sensed gap is deemed to be the actual current clearance, and it is compared to the desired clearance gap that is derived by the controller 28 from the operating conditions table. The difference or Δ between the actual clearance and the desired clearance is noted by the controller 28 and a proper voltage value is calculated by the controller 28 by amplifier 54 which multiples the difference by gain coefficient K and also an optional dynamic lead coefficient T which may be used to provide faster system response to clearance changes. The values of K and T will be pre-established by system modeling and test for optimum performance. Once the correction value is determined, the controller 28 sends an appropriate correction signal to the piezoelectric actuator power amplifier 42 which then imposes the necessary corrective voltage on the piezoelectric variable mount actuator connector or connectors 16 via line 44. This voltage is applied via alternate connectors 16 around the engine case, the remaining connectors being connected to ground. The corrective voltage is thereby applied along all corrugated segments of the piezoelectric trip 12 so as to cause identical radial motion of each seal segment. Another optional configuration could provide for negative polarity corrective voltage to be applied in place of ground to alternate connectors 16. This would double the effective voltage and seal radial motion along each corrugated segment 12 at the expense of greater electrical drive complexity. The alteration of the position of the seal segments is continuously monitored by the proximity sensors 22 so that the controller 28 is continuously updated as to current clearance gap values. Likewise, the controller 28 is constantly updated as to current engine operating conditions. The actual and desired clearance gaps are thus constantly monitored, and the clearance gap corrections are constantly applied, whenever necessary.

By using a continuous corrugated piezoelectric actuator mount for positioning the seal segments on the turbo casing, it is possible to obtain a range of seal segment motion using currently existing piezoelectric materials and typical engine case geometries of up to 0.1 inches (0.25 cm) with infinite variability. The maximum motion will increase proportionally with engine case diameter and with the square of the ratio of the engine case diameter to case/seal separation distance.

Since many changes and variations of the disclosed embodiment of the invention may be made without departing from the inventive concept, it is not intended to limit the invention except as required by the appended claims.

What is claimed is:

1. In combination with a turbine assembly which has a fixed casing, a plurality of rotating blades with radially outward blade tips, and a movable seal shroud; a blade tip seal shroud radial clearance control system which comprises:

a) a plurality of proximity sensors mounted on said turbine assembly and operable to sense ongoing radial clearance between said blade tips and said seal shroud during operation of the turbine assembly;

b) a corrugated connector operable to secure said seal shroud to said turbine casing, said connector including a corrugated piezoelectric component which serves to alter its circumferential dimension upon application of selected voltages to said connector, alternating corrugations on said connector being secured to said turbine casing, and intermediate corrugations on said connector being secured to said seal shroud;

c) DC voltage supply means for selectively applying variable DC voltage to said connector; and d) microprocessor controller means operably connected to said proximity sensors and to said voltage supply means, said controller means being programmed with a table of optimal blade tip-seal shroud clearance values, and said controller means being operable: to receive ongoing actual blade tip-seal shroud clearance signals from said proximity sensors; to compare said ongoing signals with optimal clearance values; and to actuate said voltage supply means to apply a voltage to said connector sufficient to adjust the ongoing blade tip-seal shroud clearance so as to optimize the latter.

2. The clearance control system of claim 1 wherein said seal shroud is formed from a plurality of adjacent segments and wherein adjacent segments are interconnected with each other by channel clips.

3. The clearance control system of claim 2 wherein said proximity sensors are mounted on said seal shroud.

4. The clearance control system of claim 3 wherein said proximity sensors are mounted on said seal shroud at selected ones of said channel clips.

5. The clearance control system of claim 1 wherein said controller means is connected to turbine operating condition input lines so as to receive ongoing turbine operating conditions.

6. A method for actively controlling the clearance between rotating blades and a radially movable seal shroud in a turbine having a fixed casing, said method comprising the steps of:

a) providing a curved corrugated piezoelectric coupling member which interconnects said seal shroud with said casing, said coupling member being connected to said casing at alternating corrugations, and connected to said seal shroud at intervening corrugations;

b) sensing ongoing clearances between said seal shroud and said blades during operation of the turbine;

c) comparing the sensed ongoing clearance with an optimal clearance; and d) applying a selected DC voltage to said connector when necessary to move said seal shroud radially so as to tend to conform said ongoing clearance with a predetermined optimized operating clearance.

* * * * *